United States Patent
Zhao et al.

(10) Patent No.: US 12,278,532 B2
(45) Date of Patent: Apr. 15, 2025

(54) MOTOR, COMPRESSOR AND REFRIGERATION DEVICE

(71) Applicant: ANHUI MEIZHI PRECISION MANUFACTURING CO., LTD., Anhui (CN)

(72) Inventors: Dongliang Zhao, Anhui (CN); Zhengjun Sun, Anhui (CN); Xiaohua Qiu, Anhui (CN)

(73) Assignee: ANHUI MEIZHI PRECISION MANUFACTURING CO., LTD., Anhui (CN)

( * ) Notice: Subject to any disclaimer, the term of this patent is extended or adjusted under 35 U.S.C. 154(b) by 260 days.

(21) Appl. No.: 17/835,380

(22) Filed: Jun. 8, 2022

(65) Prior Publication Data

US 2022/0302810 A1 Sep. 22, 2022

Related U.S. Application Data

(63) Continuation of application No. PCT/CN2021/120600, filed on Sep. 26, 2021.

(30) Foreign Application Priority Data

Mar. 15, 2021 (CN) .......................... 202120538606.6

(51) Int. Cl.
*H02K 19/10* (2006.01)
*F25B 31/00* (2006.01)
(Continued)

(52) U.S. Cl.
CPC .......... *H02K 19/103* (2013.01); *F25B 31/002* (2013.01); *F25B 31/026* (2013.01); *H02K 1/16* (2013.01); *H02K 2213/03* (2013.01)

(58) Field of Classification Search
CPC .... H02K 19/103; H02K 2213/03; H02K 1/16; F25B 31/002; F25B 31/026; F04C 18/0215; F04C 29/0085
See application file for complete search history.

(56) References Cited

U.S. PATENT DOCUMENTS

| 1,831,301 | A | 5/1989 | Neumann |
| RE34,667 | E * | 7/1994 | Neumann .............. H02K 17/18 |
| | | | 310/216.069 |

(Continued)

FOREIGN PATENT DOCUMENTS

| CN | 204858785 U | 12/2015 |
| CN | 208190361 U * | 12/2018 .............. H02K 1/165 |

(Continued)

OTHER PUBLICATIONS

CN204858785U English translation (Year: 2024).*

(Continued)

*Primary Examiner* — Christopher M Koehler
*Assistant Examiner* — Viswanathan Subramanian
(74) *Attorney, Agent, or Firm* — Scully, Scott, Murphy & Presser, P.C.

(57) ABSTRACT

A motor, a compressor and a refrigeration device are provided. The motor has a stator and a rotor. The stator has an annular stator yoke and multiple stator teeth located on an inner side of the stator yoke. The stator teeth are provided at intervals along a periphery of the stator yoke. The rotor is provided in the stator. The rotor has an annular rotor yoke and multiple rotor teeth located on an exterior of the rotor yoke. The rotor teeth are provided at intervals along a periphery of the rotor yoke. A tooth width of the stator teeth is T1 and a width of the stator yoke is T2, and T1 and T2 are (Continued)

defined by $4.8 \leq T2/T1 \leq 5.1$. A tooth width of the rotor teeth is L1 and a width of the rotor yoke is L2, and L1 and L2 are defined by $6.1 \leq L2/L1 \leq 6.3$.

11 Claims, 3 Drawing Sheets

(51) Int. Cl.
    *F25B 31/02*     (2006.01)
    *H02K 1/16*     (2006.01)

(56) References Cited

U.S. PATENT DOCUMENTS

2010/0141080 A1     6/2010   Tang
2020/0266676 A1*   8/2020   Tsukamoto .......... H02K 15/105

FOREIGN PATENT DOCUMENTS

| CN | 208638103 U | | 3/2019 |
| CN | 112165190 A | * | 1/2021 |

OTHER PUBLICATIONS

CN112165190A English translation (Year: 2024).*
CN208190361U English translation (Year: 2024).*
International Search Report dated Dec. 30, 2021 received in International Application No. PCT/CN2021/120600.

* cited by examiner

MOTOR, COMPRESSOR AND REFRIGERATION DEVICE

CROSS-REFERENCE TO RELATED APPLICATIONS

The present application is a continuation application of PCT International Application No. PCT/CN2021/120600, filed on Sep. 26, 2021, which claims priority to and benefits of Chinese Patent Application No. 202120538606.6, filed on Mar. 15, 2021, the entire contents of which are hereby incorporated for reference all purposes. No new matter has been introduced.

FIELD

The present application relates to the field of motors, and in particular, to a motor, a compressor and a refrigeration device.

BACKGROUND

The motor refers to an electromagnetic device that realizes the conversion or transmission of electric energy according to the law of electromagnetic induction. The motor includes a stator and a rotor. The induced electromotive force is generated through the change of magnetic flux, and the rotor rotates relative to the stator. In related technologies, because the teeth and the yoke of the stator of the motor are easy to be saturated, or the teeth and the yoke of the rotor are easy to be saturated, that is, the magnetic circuit is easy to be saturated, unreasonable distribution of iron loss and copper loss of the motor occurs, and the performance of the motor is affected and the working efficiency of the motor is reduced.

SUMMARY

The main purpose of the present application is to at least propose a motor, compressor and refrigeration device, which aims to at least improve a distribution of iron and copper loss of the motor.

In order to achieve the above purpose, according to an aspect of the present application, a motor is provided. The motor comprises a stator and a rotor The stator comprises an annular stator yoke and a plurality of stator teeth located on an inner side of the stator yoke. The plurality of stator teeth are provided at intervals along a periphery of the stator yoke. The rotor is provided in the stator and comprises an annular rotor yoke and a plurality of rotor teeth located on an exterior of the rotor yoke. The plurality of rotor teeth are provided at intervals along a periphery of the rotor yoke. A tooth width of the stator teeth is T1 and a width of the stator yoke is T2, wherein $4.8 \le T2/T1 \le 5.1$; and a tooth width of the rotor teeth is L1 and a width of the rotor yoke is L2, wherein $6.1 \le L2/L1 \le 6.3$.

In one embodiment, $0.93 \le (34 \times L1)/(30 \times T1) \le 0.99$.

In one embodiment, an inner diameter of the stator is D1, and an outer diameter of the stator is D2, wherein $0.51 \le D1/D2 \le 0.53$.

In one embodiment, an outer diameter of the rotor is D3, and $(D1-D3)/2 \le 0.50$ mm.

In one embodiment, a stator groove is formed between two adjacent stator teeth, and a number of stator grooves is 30. Additionally or alternatively, a rotor groove is formed between two adjacent rotor teeth, and a number of rotor grooves is 34.

In one embodiment, a periphery of the stator is provided with a trimming part formed by trimming treatment.

In one embodiment, T2 is a minimum width of the stator yoke.

In one embodiment, a number of the trimming parts is not less than 4, and the trimming parts are provided along the periphery of the stator.

According to another aspect of the present application, a compressor is provided. The compressor comprises a housing and a motor mounted in the housing. The motor comprises a stator and a rotor. The stator comprises an annular stator yoke and a plurality of stator teeth located on an inner side of the stator yoke. The plurality of stator teeth are provided at intervals along a periphery of the stator yoke. The rotor is provided in the stator and comprises an annular rotor yoke and a plurality of rotor teeth located on an exterior of the rotor yoke. The plurality of rotor teeth are provided at intervals along a periphery of the rotor yoke. A tooth width of the stator teeth is T1 and a width of the stator yoke is T2, wherein $4.8 \le T2/T1 \le 5.1$; and a tooth width of the rotor teeth is L1 and a width of the rotor yoke is L2, wherein $6.1 \le L2/L1 \le 6.3$.

According to yet another aspect of the present application, a refrigeration device is provided. The refrigeration device comprises a motor and/or a compressor. The compressor comprises a housing and a motor mounted in the housing. The motor comprises a stator and a rotor. The stator comprises an annular stator yoke and a plurality of stator teeth located on an inner side of the stator yoke. The plurality of stator teeth are provided at intervals along a periphery of the stator yoke. The rotor is provided in the stator and comprises an annular rotor yoke and a plurality of rotor teeth located on an exterior of the rotor yoke. The plurality of rotor teeth are provided at intervals along a periphery of the rotor yoke. A tooth width of the stator teeth is T1 and a width of the stator yoke is T2, wherein $4.8 \le T2/T1 \le 5.1$; and a tooth width of the rotor teeth is L1 and a width of the rotor yoke is L2, wherein $6.1 \le L2/L1 \le 6.3$.

In the technical solution of the present application, a ratio of a width of the stator yoke to a tooth width of the stator teeth and that of a width of the rotor yoke to a tooth width of the rotor teeth are limited, such that an air gap of the motor is limited, which restricts a magnetic flux level of the whole motor. Thus, the excitation current of the motor can be effectively reduced, a sharp increase in copper loss and iron loss of the motor due to a saturation of magnetic circuit can be avoided, the magnetic circuit of the tooth yoke of the stator and the rotor of the motor can be enabled smooth, and a distribution of iron loss and copper loss of the motor can be improved. As a result, the overall efficiency of the motor can be improved and the performance of the motor can be ensured.

BRIEF DESCRIPTION OF THE DRAWINGS

In order to more clearly explain the embodiments of the present application or the technical solutions in the prior art, the following will briefly introduce the drawings in the embodiments or the description of the prior art. It is obvious that the drawings in the following description are only some embodiments of the present application. For those skilled in the art, other drawings can be obtained according to the structure shown in these drawings without paying creative labor.

Description of reference signs shown in the figures is provided in the following table.

| Label | Name |
|---|---|
| 1 | Compressor |
| 10 | Motor |
| 20 | Housing |
| 100 | Stator |
| 100a | Central hole |
| 110 | Stator yoke |
| 111 | Trimming part |
| 120 | Stator teeth |
| 130 | Stator groove |
| 200 | Rotor |
| 210 | Rotor yoke |
| 220 | Rotor teeth |
| 230 | Rotor groove |

The realization of the purpose, functional features and advantages of the present application will be further described with reference to the attached drawings in combination with the embodiments.

DETAILED DESCRIPTION OF THE EMBODIMENTS

The technical solution in the embodiments of the present application will be clearly and completely described below in combination with the attached drawings in the embodiments of the present application. Obviously, the described embodiments are only part of the embodiments of the present application, not all of the embodiments. Based on the embodiments in the present application, all other embodiments obtained by those skilled in the art without creative work belong to the scope of protection of the present application.

It should be noted that if any embodiment of the present application involves directional indication (such as up, down, left, right, front, back . . . ), the directional indication is only used to explain the relative position relationship and movement among components in a specific attitude (as shown in the attached drawings). If the specific attitude changes, the directional indication will change accordingly.

In addition, if there is a description of "first", "second" and the like in the embodiments of the present application, the description of "first", "second" and the like is only for the purpose of description, and cannot be understood as indicating or implying its relative importance or implicitly indicating the number of indicated technical features. Thus, the features defined with "first" and "second" may include at least one of the features explicitly or implicitly. In addition, the meaning of "and/or" in the full text includes three parallel schemes, taking "A and/or B" as an example, it includes scheme A, or scheme B, or both schemes A and B. In addition, the technical solutions of various embodiments can be combined with each other, but it must be based on the realization of those skilled in the art. When a combination of technical solutions is contradictory or impossible, it shall be considered that a combination of technical solutions does not exist and is not within the protection scope of the present application.

The present application provides a motor according to an aspect thereof.

Figure 1:
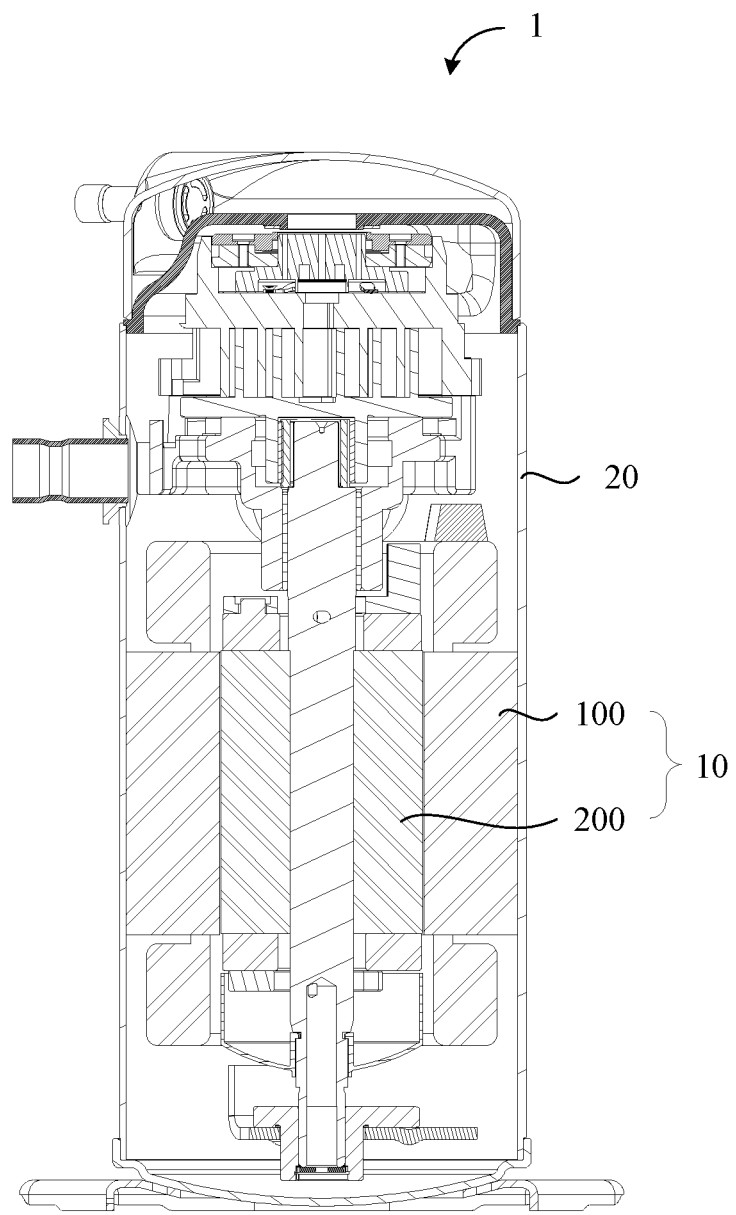
FIG. 1 is a structural view of an embodiment of a compressor of the present application.
Figure 2:
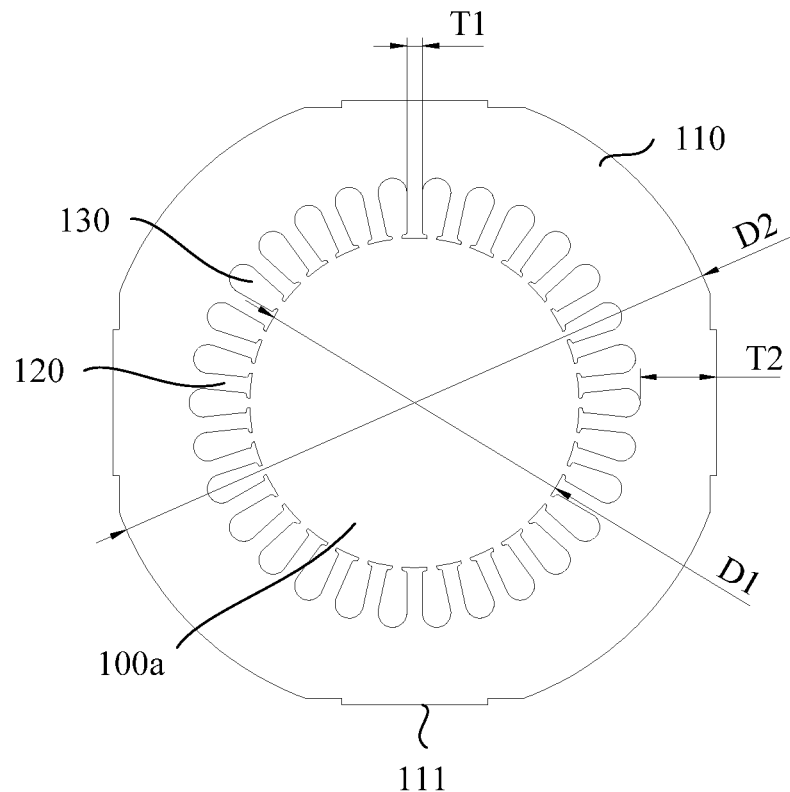
FIG. 2 is a structural diagram of an embodiment of a stator of the present application.
Figure 3:
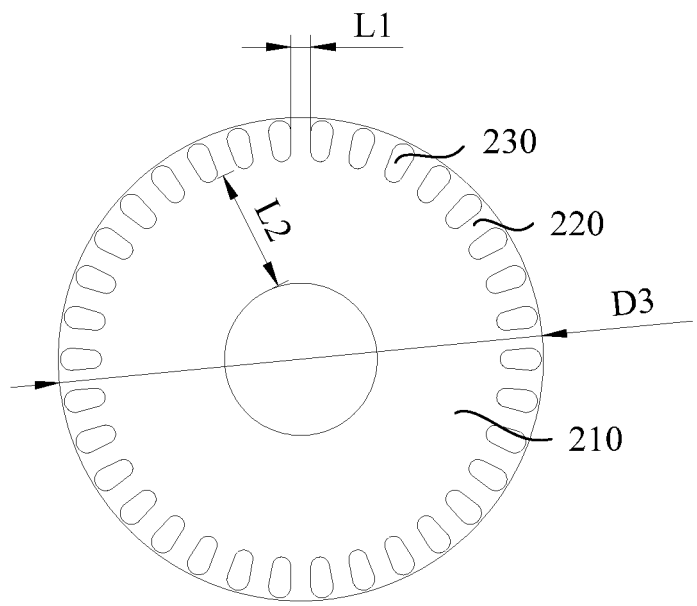
FIG. 3 is a structural diagram of an embodiment of a rotor of the present application.

In this exemplary embodiment of the present application, referring to FIGS. 1 to 3, the motor 10 includes a stator 100 and a rotor 200. The stator 100 includes an annular stator yoke 110 and a plurality of stator teeth 120 located on an inner side of the stator yoke 110. The plurality of stator teeth 120 are provided at intervals along a periphery of the stator yoke 110. A tooth width of the stator teeth 120 is T1, a width of the stator yoke 110 is T2, T2/T1 is not less than 4.8 and not greater than 5.1. Referring to FIGS. 1 and 3, the rotor 200 is provided in the stator 100. The rotor 200 includes an annular rotor yoke 210 and a plurality of rotor teeth 220 located at an exterior of the rotor yoke 210. The plurality of rotor teeth 220 are provided at intervals along a periphery of the rotor yoke 210. A tooth width of the rotor teeth 220 is L1, a width of the rotor yoke 210 is L2, L2/L1 is not less than 6.1 and not greater than 6.3. It has been discovered through tests and experiments that, by providing the stator, the rotor, the stator yoke, the stator teeth, the rotor yoke and the rotor teeth with the above ranges of dimensions and/or relationship, the distribution of iron loss and copper loss of the motor can be unexpectedly improved. Consequently, the overall performance and efficiency of the motor can be improved.

For example, the stator 100 may include a stator core and a stator winding, and the stator winding is wound on the stator core. Referring to FIG. 2, the stator core includes a stator yoke 110 and a plurality of stator teeth 120. The stator yoke 110 and the plurality of stator teeth 120 can be integrally formed. The plurality of stator teeth 120 are provided on an inner side of the annular stator yoke 110 and arranged at intervals along a circumferential direction of the annular stator yoke 110 to form a central hole 100a, and the central hole 100a is configured for the rotor 200 to pass through. Referring to FIG. 2 again, the plurality of stator teeth 120 are provided in an annular array centered on an axis of the central hole 100a, and the plurality of stator teeth 120 can be provided at equal intervals around the central hole 100a.

The stator core can be integrally formed. The process of the integrated forming is simple, which reduces the manufacturing difficulty of the stator core, and then reduces the production cost of the motor 10. In addition, since the stator core is integrally formed, it can effectively improve the mechanical properties of the stator core, and improve the stability of the motor 10 during operation and the service life of the motor 10. Referring to FIGS. 1 to 2, the stator core can also include a plurality of stator punching sheets, which are formed by stacking and punching. The stator punching sheets can be silicon steel sheets, which can reduce eddy current loss and hysteresis loss, and reduce core heating. The plurality of silicon steel sheets are insulated from each other, which can reduce the overcurrent area and further reduce the heating of stator 100.

Referring to FIG. 2, the stator punching sheet includes a stator yoke monomer, a plurality of stator tooth monomers and a central hole monomer. A plurality of stator yoke monomers of the stator punching sheets are stacked up along an axis of the stator core, so that the plurality of stator yoke monomers form the above stator yoke 110. Similarly, referring to FIG. 2, a plurality of stator tooth monomers of the stator punching sheets are stacked up along the axis of the stator core, so that the plurality of stator tooth monomers form the above stator teeth 120. The central hole monomers of the stator punching sheets are connected along the axis of the stator core, so that the plurality of central hole monomers form the central hole 100a for the rotor 200 to pass through.

Referring to FIGS. 1 and 3, the rotor 200 may include a rotor core and a magnet, which is placed in the rotor core. Referring to FIG. 1 and FIG. 3, the rotor core can be integrally formed, or can include a plurality of rotor punching sheets and rotor core are formed by stacking and punching the plurality of rotor punching sheets. The rotor punching sheets can be silicon steel sheets, and the eddy current loss, the hysteresis loss and the heating of iron core are reduced. Moreover, since the plurality of silicon steel sheets are insulated from each other, the overcurrent area can be reduced and the heating of the rotor 200 can be further reduced. It can be understood that the magnet can be a permanent magnet. The permanent magnet is made of rare earth permanent magnet materials, such as neodymium iron boron that has strong magnetic force and can further improve the performance and operation power of the motor 10.

Referring to FIG. 3, the rotor punching sheets include rotor yoke monomers and a plurality of rotor tooth monomers. When a plurality of rotor punching sheets are punched, the rotor yoke monomers of the rotor punching sheets are stacked along an axis of the rotor iron core and form the rotor yoke 210. Similarly, referring to FIG. 3, the rotor tooth monomers of the rotor punching sheets are stacked along an axis of the rotor core and form the rotor teeth 220. Referring to FIG. 3, the plurality of rotor teeth 220 are centered on the axis of the central hole 100a and provided in an annular array on a periphery of the rotor punching sheets. It can be understood that the plurality of rotor teeth 220 can be provided at equal intervals at the periphery of the exterior of the rotor yoke 210.

If the tooth width of the stator teeth 120 is overly large, or the width of the stator yoke 110 is overly small, it will lead to an easy saturation of the magnetic circuit, larger operation current, and increased copper loss and iron loss of the stator 100. Therefore, the tooth width of the stator teeth 120 cannot be overly large, and the width of the stator yoke 110 cannot be overly small Referring to FIG. 2, T1 is the tooth width of the stator teeth 120 and T2 is the width of the stator yoke 110. By limiting the ratio of the width T2 of the stator yoke 110 to the tooth width T1 of the stator teeth 120, the stator teeth 120 and the stator yoke 110 of the stator 100 are prevented from being easily saturated and the magnetic flux level is limited. The smooth magnetic circuit of the tooth yoke of the stator 100 is obtained, the distribution of iron loss and copper loss of the stator 100 and the efficiency of the motor 10 are improved.

Similarly, in order to reduce the copper loss and iron loss of the rotor 200, referring to FIG. 3, L1 is the tooth width of rotor teeth 220 and L2 is the width of rotor yoke 210. By limiting the ratio of the width L2 of rotor yoke 210 to the tooth width L1 of rotor teeth 220, the rotor teeth 220 and rotor yoke 210 of the rotor 200 are prevented from being easily saturated and the magnetic flux level is limited. The smooth magnetic circuit of tooth yoke of the rotor 200 is obtained, and the distribution of iron and copper loss of the rotor 200 and the efficiency of the motor 10 are improved.

Figure 4:
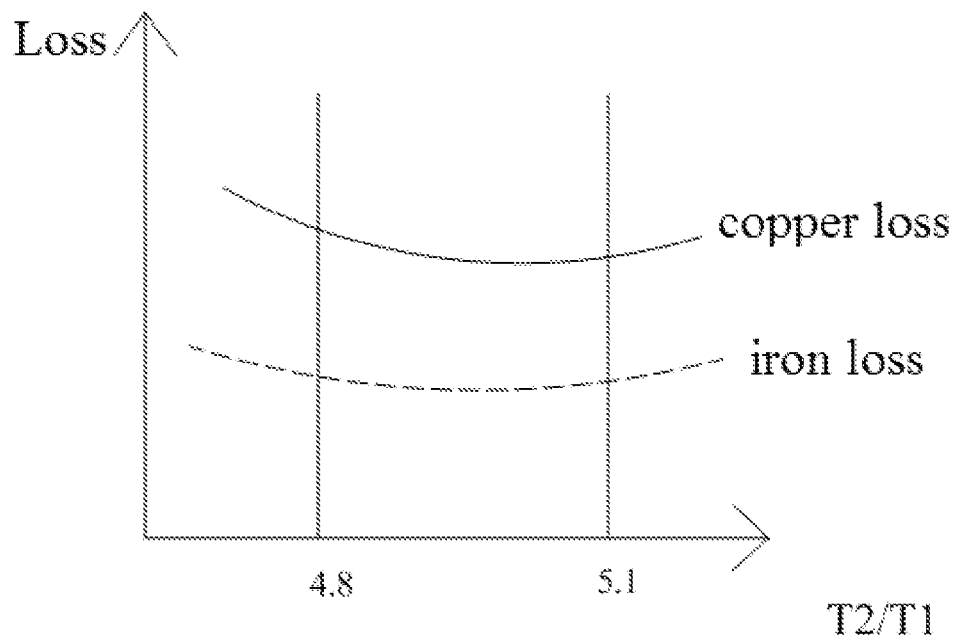
FIG. 4 is a schematic diagram of copper loss and iron loss of a motor along with T2/T1 change in the present application.
Figure 5:
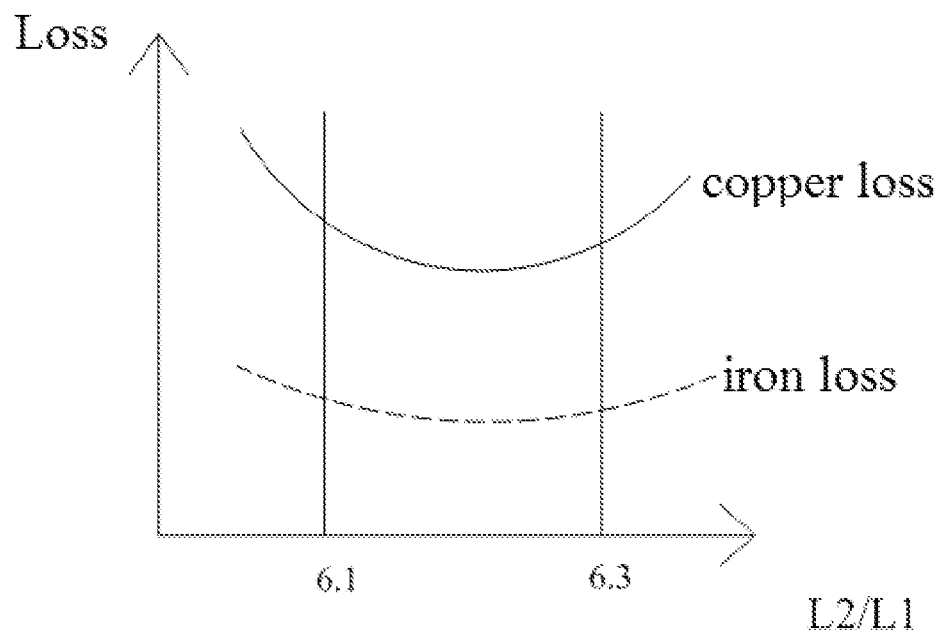
FIG. 5 is a schematic diagram of copper loss and iron loss of the motor along with L2/L1 change in the present application.

The copper loss and iron loss of motor 10 are detected. Referring to FIG. 4, as the ratio of the width T2 of stator yoke 110 to the tooth width T1 of stator teeth 120 increases, the copper loss of the motor 10 decreases and then increases. The iron loss of the motor 10 also increases as the ratio of the width T2 of the stator yoke 110 to the tooth width T1 of the stator teeth 120 increases, and the iron loss of the motor 10 decreases slowly and then increases slowly. Referring to FIG. 5, as the ratio of the width L2 of the rotor yoke 210 to the tooth width L1 of the rotor teeth 220 increases, the copper loss of the motor 10 decreases sharply and then increases rapidly. The iron loss of the motor 10 decreases and then increases as the ratio of the width L2 of the rotor yoke 210 to the tooth width L1 of the rotor teeth 220 increases, but the curve changes slowly compared with the copper loss.

Thus, the ratio of the width T2 of the stator yoke 110 to the tooth width T1 of the stator teeth 120 and that of the width L2 of the rotor yoke 210 to the tooth width L1 of the rotor teeth 220 are within a certain range, and the copper loss and iron loss of the motor 10 are relatively small. Referring to FIGS. 4 and 5, when the ratio of the width T2 of the stator yoke 110 to the tooth width T1 of the stator teeth 120 is greater than or equal to 4.8 and less than or equal to 5.1, the ratio of the width L2 of the rotor yoke 210 to the tooth width L1 of the rotor teeth 220 is greater than or equal to 6.1 and less than or equal to 6.3, and the copper loss and iron loss of the motor 10 are in a smaller range. Thus, the performance of the motor 10 is ensured and the working efficiency of the motor 10 is improved.

In the technical solution of the present application, a ratio of the width of the stator yoke 110 to a tooth width of the stator teeth 120 and a ratio of a width of the rotor yoke 210 to a tooth width of the rotor teeth 220 are limited, and an air gap of the motor 10 is thus limited, which restricts a magnetic flux level of the whole motor 10. Therefore, the excitation current of the motor 10 is effectively reduce. A sharp increase in copper loss and iron loss of the motor 10 due to saturation of magnetic circuit is avoided, and the magnetic circuit of tooth yoke of the stator 100 and the rotor 200 of the motor 10 are made smooth. Distributions of iron loss and copper loss of the motor 10 are enhanced, the overall efficiency of the motor 10 is improved and the performance of the motor 10 is ensured.

Further, in order to improve the iron loss and copper loss distributions of motor 10, in one embodiment, the result of (34×L1)/(30×T1) is not less than 0.93 and not greater than 0.99. Comprehensively considering the requirements of the magnetic circuits of the stator core and the rotor core, with a relationship between the tooth width L1 of the rotor teeth 220 and the tooth width T1 of the stator teeth 120 is defined, the distributions of iron loss and copper loss of the motor 10 are reduced and the efficiency of the motor 10 is improved.

Referring to FIG. 2, in one embodiment, an inner diameter of the stator 100 is D1, an outer diameter of the stator 100 is D2, D1/D2 is not less than 0.51 and not greater than 0.53. The inner diameter D1 of the stator 100 is a diameter of the central hole 100a. With the ratio of the inner diameter to the outer diameter of the stator 100 is limited, the magnetic field distribution of the stator 100 is improved, the proportional distributions of copper loss and iron loss of the stator 100 are effectively improved, and the performance of the motor 10 is improved. In addition, the size of the stator core and the magnetic flux of the rotor are directly limited, and the efficiency of the motor is also improved.

The diameter D1 of the central hole 100a cannot be overly small. Referring to FIG. 2, in one embodiment, D1 is not less than 150 mm with that the diameter of the central hole 100a is defined to be greater than 150 mm, the size of the rotor core is limited, and the efficiency of the motor 10 is effectively ensured.

In order to further reduce the copper loss of the motor 10, referring to FIG. 2 and FIG. 3, in one embodiment, the outer diameter of the rotor 200 is D3, the result of (D1−D3)/2 is not greater than 0.50 mm By optimizing a gap between the stator 100 and the rotor 200 of the motor 10, the excitation current of the motor 10 can be further effectively reduced, and the copper loss of the motor 10 is reduced.

Further, in order to improve the distributions of iron loss and copper loss of the motor 10, referring to FIG. 2, in one embodiment, a stator groove 130 is formed between two adjacent stator teeth 120, and the number of stator grooves 130 is 30; and/or, referring to FIG. 3, a rotor groove 230 is formed between two adjacent rotor teeth 220, and the number of rotor grooves 230 is 34.

After the ratio of the yoke width of the rotor 200 to the tooth width thereof is defined, the number of stator grooves 130 is defined as 30. Therefore, an area of each single stator groove 130 is limited, the stator winding provides an effective armature magnetic field, and the copper loss of stator winding is further reduced. The manufacturing of the stator can be facilitated. Similarly, the number of rotor grooves 230 is 34, which limits an area of each single rotor groove 230 and further reduces the iron loss of the rotor 200.

In order to facilitate the oil return when being applied to the compressor 1, referring to FIGS. 1 to 2, in one embodiment, the periphery of the stator 100 is provided with a trimming part 111 formed by trimming treatment. When the stator punching sheets are used, each stator punching sheet can be pre-trimmed and then stacked together, and thus the trimming part 111 is formed on the periphery of the stator 100. When the stator 100 is cooperated with a housing 20 of the compressor 1, an oil return gap is formed between the trimming part 111 and the housing 20, the lubricating oil brought out by the refrigerant can fall back from the oil return gap to the oil storage of the compressor 1 during the operation of the compressor 1.

Lubricating oil can flow back from the oil return gap or out of the oil return gap. In order to avoid undesirably fast outflow of the lubricating oil, referring to FIG. 2, in one embodiment, the number of the trimming parts 111 is not less than 4, and the plurality of the trimming parts 111 are provided along the periphery of the stator 100. The number of the trimming parts 111 is greater than or equal to 4, which improves the flow area of the motor 10, and reduces the oil delivery speed and the oil discharge. The lubrication of mechanical parts is ensured, and the overall performance of the motor 10 is improved.

The width of the annular stator yoke 110 may be uniform or non-uniform. When the width of the stator yoke 110 is set unevenly, referring to FIGS. 1 to 2, in one embodiment, T2 is a minimum width of the stator yoke 110. The magnetic circuit are prevented from being saturated and the copper loss and iron loss of the motor 10 are further reduced.

Referring to FIG. 1, according to another aspect of the present application, a compressor 1 is provided, which includes a housing 20 and a motor 10. The motor 10 is mounted in the housing 20. The exemplary structure of the motor 10 refers to the above embodiment. Since the compressor 1 adopts all the technical solutions of all the above embodiments, it has at least all the beneficial effects brought by the technical solution of the above embodiment, which will not be repeated here. It can be understood that the housing 20 can be provided with a holding cavity. The motor 10 is mounted in the holding cavity, and the motor 10 and the housing 20 can be fixed together by hot sleeve, welding, etc.

According to yet another aspect of the present application, a refrigeration device is provided, which comprises a compressor 1. The compressor 1 comprises the motor 10. The exemplary structure of the compressor 1 refers to the above embodiment. Since the refrigeration device adopts all the technical solutions of all the above embodiments, it has at least all the beneficial effects brought by the technical solution of the above embodiment, which will not be repeated here. Not only being applied to the compressor 1, the motor 10 can also be applied to other devices. For example, when the refrigeration device also includes a fan, the motor 10 is connected with the fan to drive the fan to operate.

It should be noted that the refrigeration device can be an air conditioner, a refrigerator, a fan, etc., and the compressor 1 can also be used for the TV, the washing machine, the dishwasher, the air conditioning purifier, etc.

The above is only an optional embodiment of the present application and does not limit the scope of the patent of the present application. Any equivalent structural transformation made by using the contents of the description and drawings of the present application under the inventive concept of the present application, or directly/indirectly applied in other relevant technical fields, are included in the scope of patent protection of the present application.

The invention claimed is:

1. A motor comprising:
   a stator comprising an annular stator yoke and a plurality of stator teeth located on an inner side of the stator yoke, the plurality of stator teeth being provided at intervals along a periphery of the stator yoke; and
   a rotor provided in the stator and comprising an annular rotor yoke and a plurality of rotor teeth located on an exterior of the rotor yoke, the plurality of rotor teeth being provided at intervals along a periphery of the rotor yoke,
   wherein a tooth width of the stator teeth is T1 and a width of the stator yoke is T2, and wherein $4.8 \leq T2/T1 \leq 5.1$; and
   wherein a tooth width of the rotor teeth is L1 and a width of the rotor yoke is L2, and wherein $6.1 \leq L2/L1 \leq 6.3$;
   wherein rotor grooves are formed between adjacent rotor teeth and a number of the rotor grooves is L3;
   wherein stator grooves are formed between adjacent stator teeth and a number of the stator grooves is T3;
   wherein L3 is greater than T3; and
   wherein $0.93 \leq (L3 \lambda L1)/(T3 \times T1) \leq 0.99$.

2. The motor according to claim 1, wherein an inner diameter of the stator is D1 and an outer diameter of the stator is D2, and wherein $0.51 \leq D1/D2 \leq 0.53$.

3. The motor according to claim 2, wherein an outer diameter of the rotor is D3, and $(D1-D3)/2 \leq 0.50$ mm.

4. The motor according to claim 1, wherein the number of stator grooves T3 is 30.

5. The motor according to claim 1, wherein the number of rotor grooves L3 is 34.

6. The motor according to claim 1, wherein a periphery of the stator is provided with a trimming part formed by trimming treatment.

7. The motor according to claim 6, wherein T2 is a minimum width of the stator yoke.

8. The motor according to claim 6, wherein a number of trimming parts is not less than 4, and the trimming parts are provided along the periphery of the stator.

9. A compressor comprising a housing and a motor according to claim 1, the motor being mounted in the housing.

10. A refrigeration device comprising a motor according to claim 1.

11. A refrigeration device comprising a compressor according to claim 9.

* * * * *